(12) United States Patent
Oyaizu et al.

(10) Patent No.: US 11,181,649 B2
(45) Date of Patent: Nov. 23, 2021

(54) FLUORESCENT SCREEN, X-RAY DETECTOR, AND X-RAY INSPECTION APPARATUS

(71) Applicants: KABUSHIKI KAISHA TOSHIBA, Tokyo (JP); TOSHIBA MATERIALS CO., LTD., Yokohama (JP)

(72) Inventors: Eiji Oyaizu, Yokohama (JP); Makoto Hayashi, Chigasaki (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 0 days.

(21) Appl. No.: 16/821,080

(22) Filed: Mar. 17, 2020

(65) Prior Publication Data
US 2021/0190975 A1    Jun. 24, 2021

Related U.S. Application Data (63) Continuation of application No. PCT/JP2019/049961, filed on Dec. 19, 2019.

(51) Int. Cl.
*G01T 1/202* (2006.01)
*G21K 4/00* (2006.01)

(52) U.S. Cl.
CPC ............ *G01T 1/202* (2013.01); *G21K 4/00* (2013.01); *G21K 2004/06* (2013.01)

(58) Field of Classification Search
CPC ....... G01T 1/202; G21K 4/00; G21K 2004/06
See application file for complete search history.

(56) References Cited

U.S. PATENT DOCUMENTS 4,057,508 A * 11/1977 Wolfe ................ C09K 11/7791
                                                    252/301.4 H
4,782,237 A * 11/1988 Teraoka ................... G21K 4/00
                                                    250/484.4

(Continued)

FOREIGN PATENT DOCUMENTS

EP    2 767 982 A1    8/2014
JP    H05-100037 A1   4/1993
(Continued)

OTHER PUBLICATIONS

Hiromichi Yamada, et al., "A Scintillator $Gd_2O_2S$:PR, CE, F for X-Ray Computed Tomography," *J. Electrochem. Soc.*, vol. 136, No. 9, Sep. 1989, pp. 2713-2716.

(Continued)

*Primary Examiner* — David P Porta
*Assistant Examiner* — Djura Malevic
(74) *Attorney, Agent, or Firm* — Burr & Brown, PLLC (57) ABSTRACT

A fluorescent screen is configured to convert an X-ray into visible light to one embodiment. The screen includes a gadolinium oxysulfide phosphor activated with praseodymium and cerium. The phosphor contains praseodymium having a concentration of 0.01 mass % or more and 0.3 mass % or less and cerium having a concentration of 5 ppm or more and 30 ppm or less. An average particle diameter of the phosphor is 10 μm or more and 20 μm or less. A weight per unit area of the phosphor is 270 mg/cm² or more and 380 mg/cm² or less.

9 Claims, 3 Drawing Sheets

(56) References Cited

U.S. PATENT DOCUMENTS

| | | | | |
|---|---|---|---|---|
| 5,296,163 | A * | 3/1994 | Leppert | C04B 35/50 252/301.4 S |
| 5,302,817 | A * | 4/1994 | Yokota | C09K 11/7733 250/214 VT |
| 5,521,387 | A * | 5/1996 | Riedner | C09K 11/7769 250/367 |
| 5,956,382 | A * | 9/1999 | Wiener-Avnear | G01T 1/20 378/98.8 |
| 6,384,417 | B1 * | 5/2002 | Okumura | G01T 1/20 250/367 |
| 6,392,248 | B1 * | 5/2002 | Takahara | G21K 4/00 250/306 |
| 6,504,156 | B1 * | 1/2003 | Takahara | C09K 11/7771 250/361 R |
| 6,630,675 | B2 * | 10/2003 | Ghelmansarai | C09K 11/7771 250/366 |
| 7,238,955 | B2 * | 7/2007 | Fukui | G03B 42/08 250/484.4 |
| 7,675,039 | B2 * | 3/2010 | Oyaizu | C09K 11/7767 250/370.11 |
| 8,492,724 | B2 * | 7/2013 | Ronda | G21K 4/00 250/361 R |
| 9,638,807 | B2 * | 5/2017 | Ronda | G01T 1/202 |
| 9,771,515 | B2 * | 9/2017 | Wang | C04B 35/6303 |
| 10,132,939 | B2 * | 11/2018 | Adachi | G01T 1/2018 |
| 10,654,196 | B2 * | 5/2020 | Wang | B28B 3/025 |
| 10,684,377 | B2 * | 6/2020 | Morimoto | C09K 11/7771 |
| 2003/0127630 | A1 * | 7/2003 | Vartuli | C09K 11/7774 252/301.4 R |
| 2004/0091696 | A1 * | 5/2004 | Nair | G21K 4/00 428/327 |
| 2004/0100000 | A1 * | 5/2004 | Kobusch | C04B 35/50 264/654 |
| 2005/0098738 | A1 * | 5/2005 | Laney | G03C 1/49881 250/483.1 |
| 2005/0100838 | A1 * | 5/2005 | Dickerson | G03C 5/16 430/496 |
| 2005/0100840 | A1 * | 5/2005 | Dickerson | G03C 5/17 430/496 |
| 2006/0054830 | A1 * | 3/2006 | Oyaizu | G21K 4/00 250/370.11 |
| 2006/0065852 | A1 * | 3/2006 | Fukui | G03B 42/08 250/484.4 |
| 2006/0145085 | A1 * | 7/2006 | Fukuta | C09K 11/7771 250/370.11 |
| 2007/0027025 | A1 * | 2/2007 | LaCourse | C04B 35/6455 501/152 |
| 2008/0210885 | A1 * | 9/2008 | Bolyasnikova | C04B 35/64 250/473.1 |
| 2010/0247148 | A1 * | 9/2010 | Haruyama | G03G 5/14769 399/159 |
| 2011/0180715 | A1 | 7/2011 | Ronda et al. | |
| 2012/0012787 | A1 * | 1/2012 | LaCourse | C04B 35/632 252/301.4 R |
| 2012/0064464 | A1 * | 3/2012 | Fitterman | G03C 5/262 430/405 |
| 2012/0145962 | A1 * | 6/2012 | Fukuta | C09K 11/7774 252/301.4 R |
| 2013/0083891 | A1 * | 4/2013 | Oyaizu | C09K 11/7771 378/57 |
| 2014/0301527 | A1 * | 10/2014 | Morimoto | G01N 23/046 378/4 |
| 2015/0021485 | A1 * | 1/2015 | Hayashi | C09K 11/7774 250/361 R |
| 2016/0282480 | A1 * | 9/2016 | Yamamoto | G21K 4/00 |
| 2017/0199285 | A1 * | 7/2017 | Adachi | G01T 1/20 |
| 2018/0138374 | A1 * | 5/2018 | Funayama | C09K 11/7774 |
| 2018/0252824 | A1 * | 9/2018 | Morimoto | G01T 1/20 |
| 2019/0108924 | A1 * | 4/2019 | Nakamura | C09K 11/7771 |
| 2020/0408936 | A1 * | 12/2020 | Tanino | G01T 1/2018 |

FOREIGN PATENT DOCUMENTS

| | | |
|---|---|---|
| JP | 2928677 B2 | 8/1999 |
| JP | 2002-275465 A1 | 9/2002 |
| JP | 2007-292583 A1 | 11/2007 |
| JP | 2012-220348 A1 | 11/2012 |
| JP | 5241979 B2 | 7/2013 |
| JP | 5759374 B2 | 8/2015 |
| WO | 2013/051165 A1 | 4/2013 |
| WO | 2017/078051 A1 | 5/2017 |

OTHER PUBLICATIONS

Japanese Office Action (Application No. 2018-137052) dated Feb. 2, 2021 (with English translation).

* cited by examiner

FLUORESCENT SCREEN, X-RAY DETECTOR, AND X-RAY INSPECTION APPARATUS

CROSS-REFERENCE TO RELATED APPLICATIONS

This application is a continuation of prior International Application No. PCT/JP2019/049961 filed on Dec. 19, 2019; the entire contents of all of which are incorporated herein by reference.

FIELD

Embodiments relate to a fluorescent screen, an X-ray detector, and an X-ray inspection apparatus.

BACKGROUND

For an anti-terrorism measure and safe flight of an aircraft, luggage is inspected in advance at an airport when being carried into the aircraft. As luggage inspection apparatuses for inspecting such luggage, in general, there are broadly used a transmitted X-ray inspection apparatus utilizing transmission of an X-ray, a Compton scattered X-ray inspection apparatus utilizing Compton scattering of an X-ray, and a dual energy type X-ray inspection apparatus utilizing an X-ray energy difference which is obtained from image processing of a high-energy X-ray image and a low-energy X-ray image, for example, and recently, an X-ray computed tomography (CT) apparatus is also used.

The transmitted X-ray can relatively easily find a metal article which is hard to allow an X-ray to pass through, that is, for example, a metal weapon such as a firearm or a knife. Meanwhile, a substance mainly constituted by an element with a small atomic number, such as a plastic bomb or a narcotic drug, easily transmits the X-ray. Such a substance can be detected by the X-ray inspection apparatus such as the Compton scattered X-ray inspection apparatus or the dual energy type X-ray inspection apparatus.

The inspection using the common X-ray inspection apparatus includes: leading an X-ray (transmitted X-ray) from a target to an X-ray detector; converting the detected X-ray into visible light such as fluorescence by a fluorescent screen (scintillator); detecting an intensity of the visible light by a detector such as a photoelectric conversion element or a photomultiplier tube; and display an image of the inside of the luggage in accordance with the intensity.

The improvement of inspection accuracy is to display a clearer image. Display of the clearer image is to input visible light with a sufficient intensity to the detector such as the photoelectric conversion element. The intensity of the visible light can be increased by enhancing the intensity of the X-ray irradiated to the luggage for example, but the enhancement can enlarge the apparatus and can also increase a risk of radiation exposure by the leakage X-ray, in the X-ray inspection apparatus such as an airport luggage inspection apparatus installed in a public place.

Thus, what is important here is a conversion efficiency from the X-ray into the visible light of the fluorescent screen. Using the fluorescent screen excellent in conversion efficiency when converting the X-ray into the visible light makes it possible to obtain high-luminance visible light without enhancing the intensity of X-ray, so that the visible light having the sufficient intensity can be inputted to the detector such as the photoelectric conversion element.

DETAILED DESCRIPTION

A fluorescent screen is configured to convert an X-ray into visible light to one embodiment. The screen includes a gadolinium oxysulfide phosphor activated with praseodymium and cerium. The phosphor contains praseodymium having a concentration of 0.01 mass % or more and 0.3 mass % or less and cerium having a concentration of 5 ppm or more and 30 ppm or less. An average particle diameter of the phosphor is 10 μm or more and 20 μm or less. A weight per unit area of the phosphor is 270 mg/cm² or more and 380 mg/cm² or less.

Hereinafter, embodiments will be described with reference to the drawings. A relationship between a thickness and a plane size of each component illustrated in the drawing, a ratio of a thickness of each component, and so on are sometimes different from those of an actual object. Further, in the embodiments, the same component in practice is given the same reference symbol and explanation thereof will be omitted accordingly.

Figure 1:
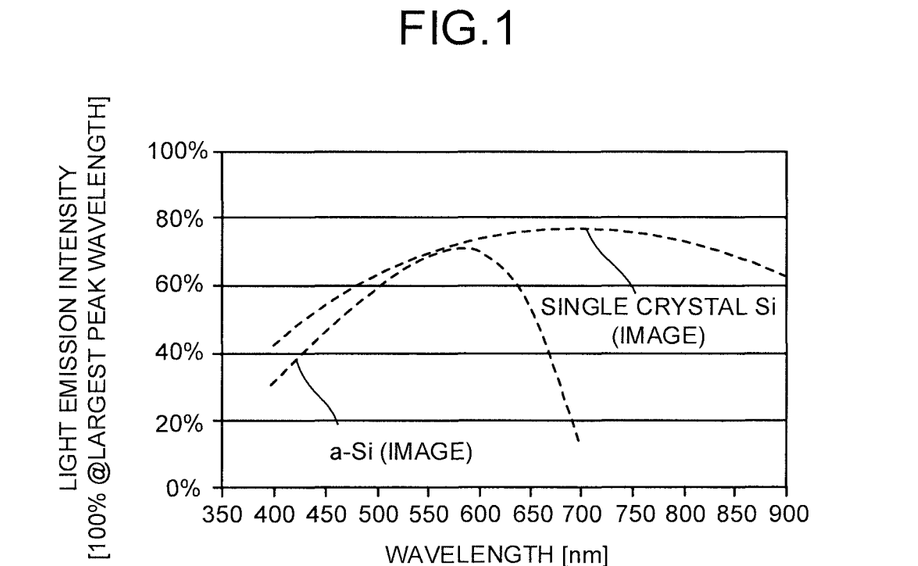
FIG. 1 is schematic chart illustrating a spectral sensitivity characteristic of a photodiode used in an X-ray detector.

An X-ray detector applied to an X-ray inspection apparatus usually uses a photoelectric conversion element having a spectral sensitivity characteristic in a wavelength range of 400 nm or more and 900 nm or less. FIG. 1 is a schematic chart illustrating a spectral sensitivity characteristic of a photodiode (PD) used in the X-ray detector. FIG. 1 shows a curve representing a spectral sensitivity characteristic of a photodiode using amorphous silicon (a-Si) and a curve representing a spectral sensitivity characteristic of a photodiode using single-crystal silicon (single crystal Si).

A fluorescent screen preferably uses a phosphor having a peak of a light emission wavelength in a wavelength range of 400 nm or more and 900 nm or less. Additionally, it is preferable to use a phosphor having a high conversion efficiency.

Examples of the phosphor for such application include phosphors such as an $A_2O_2S:D$ (A represents at least one element selected from a group consisting of Gd, La, and Y, and D represents at least one element selected from a group consisting of Pr, Ce, and Yb) phosphor and a BaFX:Eu, A (X represents at least one element selected from a group consisting of Cl and Br, and A represents at least one element selected from a group consisting of Ce and Yb)phosphor. The phosphor can be effectively used as a material which converts a transmitted X-ray or a Compton scattered X-ray into visible light. If the fluorescent screen containing the phosphor is used in the X-ray detector, its application amount (a weight per unit area of the phosphor) of about 200 mg/cm² leads to high power of the detector.

Another example of the phosphor is a phosphor in which 25% or more of Gd of a $Gd_2O_2S$ (GOS) material is substituted by a rare-earth element such as La or Lu and doped with at least one of elements of Ce and Pr. The GOS material is doped with Pr at a $Pr^{3+}$ concentration of 100 mol ppm or more and 1000 mol ppm or less, for example, and doped with Ce at a $Ce^{3+}$ concentration of 0 mol ppm or more and 50 mol ppm or less, for example.

Another example of the phosphor is a gadolinium oxysulfide phosphor which is represented by a general expression: $(Gd_{1-x}RE'_x)_2O_2S$:Pr (in the expression, RE' represents at least one element selected from Y, La, and Lu and X is a number satisfying $0<X\leq0.1$) and contains at least one selected from a group consisting of cerium, zirconium, and phosphorus as a coactivator. An average particle diameter of gadolinium oxysulfide phosphor powder is 6 μm or more and 10 μm or less, for example, a content of Pr is in a range of 0.001 mol % or more and 10 mol % or less, for example, and a content of the coactivator selected from Ce, Zr, and P is in a range of 0.0001 mol % or more and 0.1 mol % or less.

A Pr content of a $Gd_2O_2S$:Pr, Ce, F phosphor is $1\times10^{-3}$ atom %. Ce and F reduce afterglow of light emission.

When an X-ray is irradiated to a phosphor, the X-ray absorbed by the phosphor is converted into visible light and the phosphor begins to emit light, but when the irradiation of the X-ray is interrupted thereafter, light emission of the phosphor gradually decreases to finally disappear. The light emission after interruption of the X-ray is referred to as afterglow. A value of the afterglow is indicated, for example, by using a relative value (%) obtained by dividing a light output value at an interruption time of the X-ray by a light output value after elapsing of a predetermined time.

The X-ray detector having the photoelectric conversion element which converts the visible light into an electrical signal is used in a broad range of applications and requires a fluorescent screen which can cope with the range of applications. Diversification of inspected luggage demands more accurate distinction of luggage having complex shapes, requiring improvement in inspection accuracy more than conventionally required. Therefore, a fluorescent screen having a characteristic of small afterglow in addition to a high light output characteristic has increasingly become important.

Aircraft is readily used and luggage of tourists and air cargo increases, and X-ray inspection apparatuses are continuously used and inspect luggage speedily. Accordingly, improvement of the afterglow characteristic is demanded more severely. On the other hand, there are cases where inspection speed is limited due to the afterglow characteristic of the phosphor, and a phosphor having small afterglow is demanded also in that respect.

When the phosphor having large afterglow is used in the fluorescent screen of the X-ray inspection apparatus for luggage inspection, inspection accuracy is adversely affected. This is because a target image being observed overlaps a residual image of a previous image when luggage inspection is continuously performed, which hampers acquisition of a clear image.

As a characteristic similar to afterglow, a persistence characteristic is cited. The persistence characteristic is found in accordance with a time until a light emission intensity of a phosphor decreases to one tenth after interruption of irradiation of an X-ray. In a conventional X-ray inspection apparatus, a countermeasure for the residual image is implemented by managing the persistence characteristic of the phosphor to be 1 ms or less. However, managing the persistence characteristic is not sufficient for inspection conditions of recent years.

Even if the light emission intensity of the phosphor decreases to one tenth in a short time, weak light sometimes continues for a predetermined period after reduction of the light emission intensity to one hundredth to one thousandth. In luggage inspection, such weak light has an influence as a residual image to cause a problem. The afterglow characteristic is a characteristic found by observing light emission of the phosphor until it becomes close to zero, and control of the afterglow characteristic is important.

Further, to cope with a system of an X-ray inspection apparatus having a photoelectric conversion element, a fluorescent screen which maintains a good afterglow characteristic and has a higher output is demanded. Examples of a method for obtaining a higher light output include a method of making an intensity of an irradiation X-ray in the X-ray inspection apparatus higher than a conventional voltage of 80 kV or more and 120 kV or less in X-ray tube voltage. Thus, a fluorescent screen is necessary which is compatible with an X-ray inspection apparatus using the irradiation X-ray over the conventional voltage of 120 kV in X-ray tube voltage and has small afterglow.

One of the objects of the fluorescent screen used in the X-ray detector of the embodiment is to provide an X-ray inspection apparatus having high inspection accuracy optimum for application environment and condition of a recent X-ray inspection apparatus, and the fluorescent screen is used for providing an X-ray inspection apparatus which attains a sufficient detection sensitivity, does not have an afterglow problem, and is capable of obtaining a clear image.

The X-ray detector of the embodiment is suitable especially for the X-ray inspection apparatus using the irradiation X-ray whose X-ray tube voltage exceeds the conventional voltage of 120 kV, and has the fluorescent screen converting the X-ray into visible light such as fluorescence as well as the photoelectric conversion element converting the visible light into an electrical signal.

The fluorescent screen used in the X-ray detector of the embodiment has a praseodymium and cerium-activated gadolinium oxysulfide ($Gd_2O_2S$:Pr, Ce)phosphor.

Since the X-ray detector requires improvement of the light output by the X-ray, it is necessary to enhance a light emission efficiency of the fluorescent screen converting the X-ray into visible light. Examples of a method for enhancing the light emission efficiency include enlarging an average particle diameter of phosphor. By enlarging the average particle diameter, a phosphor layer of the fluorescent screen has transparency and emitted light reaches a photodiode without attenuation, thereby being able to improve the light output. However, enlarging the average particle diameter has a disadvantage such that an obtained image becomes grainy, which causes a reduction of sharpness. Therefore, conventionally, a phosphor of 5 μm or more and 10 μm or less in average particle diameter are mainly used.

Another method of enhancing the light emission efficiency is increasing an amount of a phosphor by thickening a phosphor layer of a fluorescent screen, for example. Thereby, a light output can be improved. However, when the phosphor layer becomes extremely thick, an X-ray becomes hard to be transmitted and light from the phosphor layer becomes hard to reach a photodiode, causing a reduction of the light output. Therefore, a weight per unit area of a phosphor in a fluorescent screen of a conventional general-purpose product is approximately 200 $mg/cm^2$.

Note that the average particle diameter of the conventional phosphors and the thickness of the phosphor layer are conditions for being used in the X-ray inspection apparatus whose X-ray tube voltage is in the range of 80 kV or more and 120 kV or less, and presently, by making the X-ray tube voltage larger than 120 kV, the light output can be improved.

Figure 2:
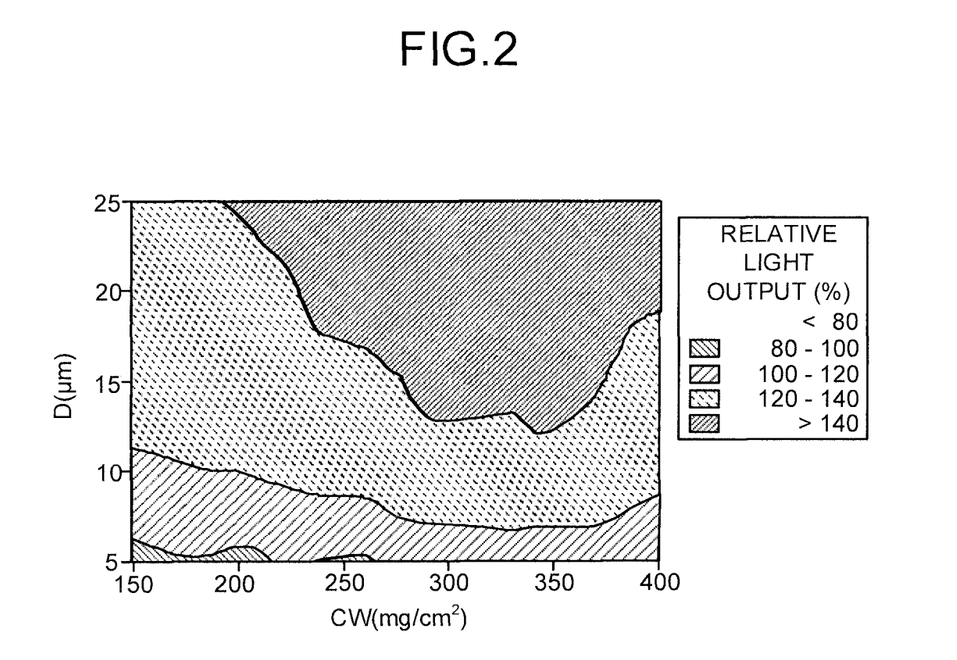
FIG. 2 is a chart illustrating a contour line plot of a relative light output (%) of a fluorescent screen in relation to an average particle diameter (D) of phosphor and a weight per unit area (CW) of the phosphor.

FIG. 2 is a chart illustrating a contour line plot of a relative light output (%) of a fluorescent screen in relation to an average particle diameter (D) of the phosphor and a weight per unit area (CW) of the phosphor. The average particle diameter (D) of the phosphor is a value measured by an air permeability method such as a Braine method or a Fisher method. FIG. 2 illustrates a light output at an X-ray tube voltage of 160 kV, in which the phosphor not containing Ce is used and an investigation result of influences of the above is shown. The relative light output is expressed by a relative value (%) in relation to the light output of the fluorescent screen of the conventional conditions (the average particle diameter (D) of 8 μm and the weight per unit area of the phosphor of 200 mg/cm$^2$) being 100%.

It is obvious from FIG. 2 that at an X-ray intensity of 160 kV in X-ray tube voltage, a light output has a high value under a condition different from a conventional one. In a region in which the average particle diameter is over 10 μm, a high output can be obtained. However, since sharpness is eminently reduced when the average particle diameter exceeds 20 μm in an actual image test, the particle diameter is preferably in a range of 10 μm or more and 20 μm or less, and more preferably in a range of 13 μm or more and 18 μm or less.

With regard to the phosphor layer, making it thicker than the conventional one enables a higher light output, but a downward tendency is recognized when the weight per unit area of the phosphor is about 400 mg/cm$^2$. Therefore, a high output can be obtained by setting the weight per unit area of the phosphor to be in a weight range of 270 mg/cm$^2$ or more and 380 mg/cm$^2$ or less, further preferably 300 mg/cm$^2$ or more and 350 mg/cm$^2$ or less. Such a tendency is almost the same when the X-ray tube voltage is in a range of 140 kV or more and 180 kV or less.

For improvement of the light emission efficiency, it is preferable to control a sphericity of the phosphor. Table 1 shows a relationship between a Wadell's sphericity (hereinafter, also referred to as a "sphericity") of the phosphor whose average particle diameter (D) of the phosphor is about 15 μm and a light output by an X-ray. The light output is a measured value when the weight per unit area of the phosphor is 300 mg/cm$^2$ and an X-ray intensity is 160 kV in X-ray tube voltage.

TABLE 1

| Sphericity (ψ) | Light output (relative value) |
| --- | --- |
| 0.62 | 140 |
| 0.71 | 142 |
| 0.8 | 144 |
| 0.91 | 146 |

It is obvious from Table 1 that the light output increases together with the value of the Wadell's sphericity. Thus, the Wadell's sphericity of the phosphor is preferably 0.8 or more, and more preferably 0.85 or more.

The Wadell's sphericity ψ is defined by an expression A1 as a proportion between a surface area of an actual particle and a surface area of a sphere having the same volume as the actual particle.

ψ=(a surface area of a sphere having the same volume as a particle)/(a surface area of an actual particle)    (A1)

Normally, with regard to particles having arbitrary volumes, the particle having the smallest surface area is the spherical particle. Therefore, a Wadell's sphericity of a normal particle is 1 (one) or less and in a case where a particle shape is not spherical, it is closer to 1 (one) as the particle shape is closer to spherical.

The Wadell's sphericity can be found by the following method. First, a particle size distribution of powder phosphor is measured by a Coulter counter method. The Coulter counter method is a method for specifying a particle size from voltage variation in accordance with a volume of a particle. In the particle size distribution obtained by the Coulter counter method, a number frequency in a certain particle diameter Di is set to Ni. The particle diameter Di is a diameter of the spherical particle having the same volume as the actual particle whose particle size is specified by the Coulter-counter method.

A specific surface area S of the powder phosphor is calculated by using the number frequency Ni and the particle diameter Di. The specific surface area S is a value obtained by dividing a surface area of the powder by weight thereof, and it is defined as a surface area per unit weight. The weight of the particle having the particle diameter Di is $(4\pi/3) \times (Di/2)^3 \times Ni \times \rho$ (where ρ is a density of the powder). The weight of the powder is a sum of weights of particles by each particle diameter, and it is represented by an expression A2.

Weight of powder=$\Sigma\{(4\pi/3) \times (Di/2)^3 \times Ni \times \rho\}$    (A2)

The surface area of the particle having the particle diameter Di is $4\pi \times (Di/2)^2 \times Ni$. When the actual particle shape is not spherical, a specific surface area of the actual particle is a value ($\{4\pi \times (Di/2)^2 \times Ni\}/\psi$) obtained by dividing the surface area of the particle by the Wadell's sphericity ψ, and the specific surface area S of the powder is a sum of the specific surface areas of the particles by each particle diameter, which is represented by an expression A3. In reality, the Wadell's sphericity ψ may have a different value by each particle diameter, but it can be taken as an average value being a deviation from the sphere as a whole of the powder.

$$S = [\Sigma\{4\pi \times (Di/2)^2 \times Ni\}/\psi]/[\Sigma\{(4\pi/3) \times (Di/2)^3 \times Ni \times \rho\}] \quad (A3)$$
$$= (6/\rho/\psi) \times \{\Sigma(Di^2 \times Ni)\}/\{\Sigma(Di^3 \times Ni)\}$$

As methods measuring the particle diameter of powder, air permeability methods such as a Blaine method and a Fisher method are known. In the air permeability method, powder is filled in a metal tube whose both ends are opened, and then air is passed through a powder layer thereof to specify the particle diameter from a passage ratio of the air. The particle diameter specified by the air permeability method is also called a specific surface area diameter (d). A relationship between the specific surface area diameter (d) and the specific surface area (S) is represented by an expression A4.

$S=6/\rho/d$    (A4)

Accordingly, the Wadell's sphericity ψ is represented by an expression A5, which can be calculated by comparing the specific surface area S calculated from the particle size distribution and the specific surface area S calculated from the particle diameter obtained by the air permeability method. Though the particle diameter of the particle size distribution is normally represented as a particle diameter range, the particle diameter Di is set as an intermediate value of the particle diameter range, and the particle diameter range is set every 0.2 µm so as to increase accuracy in this embodiment. When the particle size distribution is plotted on logarithmic normal probability paper, it can be approximated by two lines. Accordingly, it is possible to easily obtain number frequency data of every 0.2 µm from normal probability distributions of these two lines.

$$\ll = d \times \{\Sigma(Di^2 \times Ni)\}/\{\Sigma(Di^3 \times Ni)\} \quad (A5)$$

Wadell's sphericity is an index to judge whether the particle shape of the phosphor is spherical or not and is a three-dimensional parameter. Such an index uses an aspect ratio, a circular degree (a peripheral length of a circle with an equal projected area/a peripheral length of a particle) or the like in accordance with a scanning electron microscope (SEM) image, a projected image or the like of the particle, for example. These are each two-dimensional parameters and are not parameters for a sphere in a narrow sense. For example, in a case of a particle having a coin shape, for example, a Wadell's sphericity is less than 0.6 even if the circular degree is 0.9 or more.

Inside the fluorescent screen, visible light irradiated from a certain phosphor particle is reflected on a surface of another phosphor particle to thereby repeat multiple reflections, and the light is taken out to the outside. A reflection phenomenon of light lowers an energy efficiency of light. For suppressing the lowering of the energy efficiency of light, sphericity of the particle shape of the phosphor is improved and a surface area of the particle is reduced, so that the light output is increased.

The sphericity can be enhanced by producing the phosphor by using a later-described manufacturing method. In the manufacturing of the phosphor, several kinds of raw materials containing constituent elements of the phosphor and a flux (fusing agent) promoting a synthesis reaction are used. As the flux, alkali metal phosphate among rare-earth sulfates is generally used, and a shape of a particle can be changed by changing the kind and amount thereof. The sphericity being 1 (one) means that the shape of the particle is a perfect sphere, but in reality, it is difficult to obtain a phosphor having a sphericity of 0.96 or more, which leads to a higher cost. Accordingly, the Wadell's sphericity of the phosphor is preferably 0.8 or more and 0.96 or less, and more preferably 0.85 or more and 0.96 or less.

Figure 3:
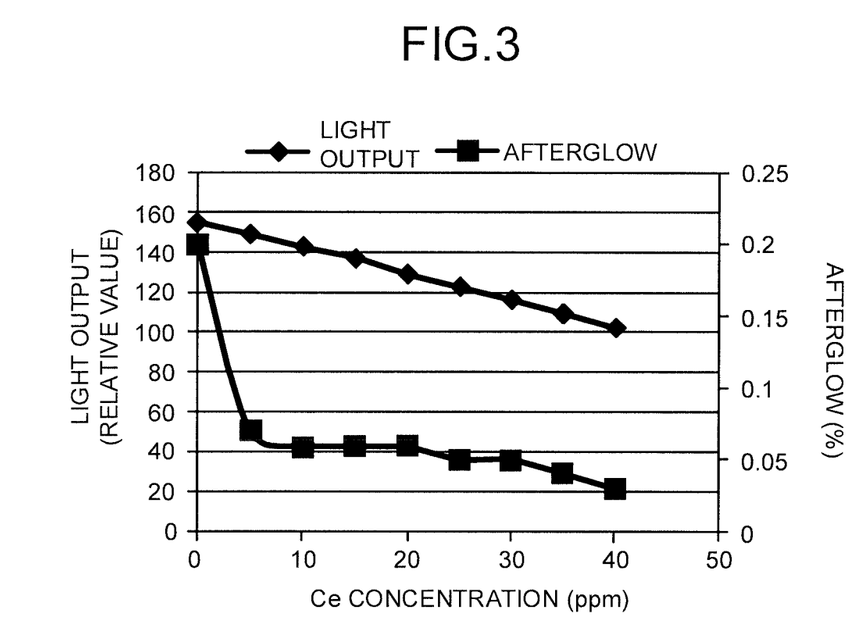
FIG. 3 is a chart illustrating a light output and an afterglow characteristic in relation to a Ce concentration.

Afterglow of the phosphor can be controlled, for example, by adding cerium (Ce) to the phosphor. FIG. 3 is a chart illustrating a light output and an afterglow characteristic in relation to a Ce concentration. FIG. 3 is a chart illustrating a light output and an afterglow characteristic in a case where a fluorescent screen containing a $Gd_2O_2S$:Pr phosphor is used in an X-ray detector and an X-ray inspection apparatus. The light output and the afterglow characteristic shown in FIG. 3 are values obtained by measurement when an average particle diameter of the phosphor is 15 µm and a weight per unit area of the phosphor is 300 mg/cm², at an X-ray intensity of 160 kV in X-ray tube voltage.

Figure 4:
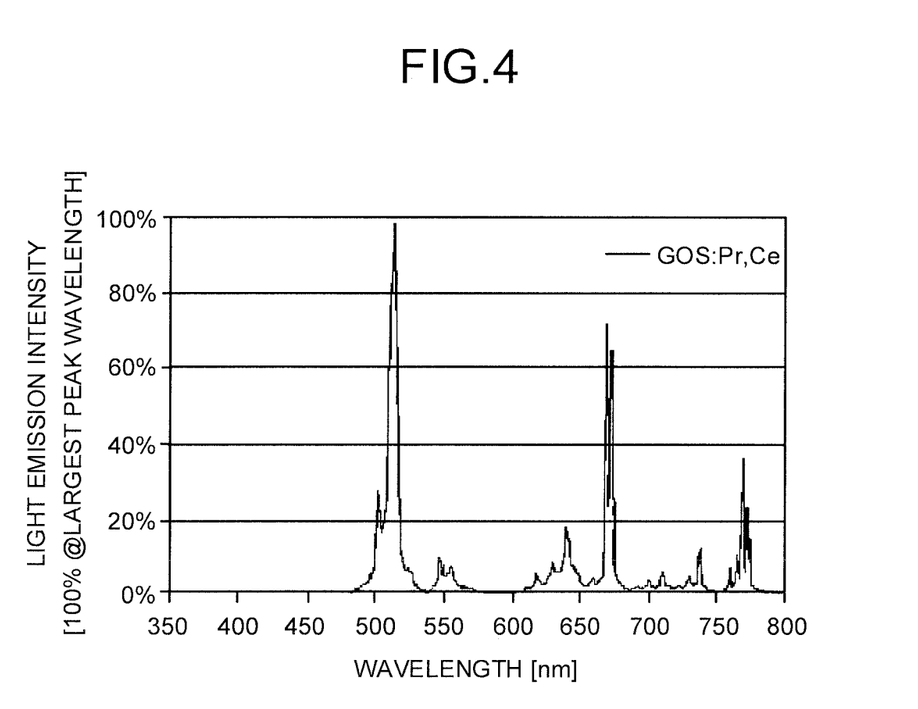
FIG. 4 is a chart illustrating a light emission spectrum of a $Gd_2O_2S:Pr,Ce$ phosphor.

FIG. 4 is a chart illustrating a light emission spectrum of a $Gd_2O_2S$:Pr,Ce phosphor. In the light emission spectrum of the $Gd_2O_2S$:Pr,Ce phosphor illustrated in FIG. 4, peaks of the light emission wavelength appear near 512 nm, 670 nm, and 770 nm, and a light emission efficiency (an efficiency of converting an X-ray into visible light) is quite high. Therefore, when using a silicon photodiode (Si-PD) having a peak of the light receiving sensitivity in a wavelength range of 400 nm or more and 900 nm or less in an X-ray detector, it has good compatibility with a fluorescent screen, so that detection at a high output is available. A Ce coactivator to be added to $Gd_2O_2S$:Pr does not influence the light emission wavelength, so that the light emission peak wavelength is unchanged even when Ce is added.

Afterglow of 20 ms later from X-ray irradiation interruption is preferably 0.06% or less. A value of the afterglow is represented by a relative value (%) of a light output after a lapse of 20 ms from the interruption of the X-ray irradiation when the light output at the time of interruption of the X-ray irradiation is set to 100%. When the value is 0.06% or less, a clear image without a residual image can be displayed even if the X-ray inspection apparatus is used continuously under normal conditions. With this characteristic, a clear image without a residual image can be displayed if the present X-ray inspection apparatus is used at any speed. The phosphor of FIG. 4, where afterglow of 20 ms later from interruption of X-ray irradiation exhibits quite a low value of 0.06%, has an excellent afterglow characteristic. Thus, when the X-ray inspection apparatus is continuously used with a fluorescent screen containing the phosphor as above being applied, a clear image without a residual image can be displayed.

Such light output and afterglow characteristic can be obtained by optimizing a concentration of praseodymium and coactivating cerium in the $Gd_2O_2S$:Pr, Ce phosphor. The light output has a peak in a range of 0.05 mass % or more and 0.1 mass % or less in praseodymium concentration, and is gradually reduced when exceeding it. Accordingly, the concentration of praseodymium is, practically, preferable to be 0.01 mass % or more and 0.3 mass % or less, more preferable to be 0.03 mass % or more and 0.2 mass % or less, and further preferable to be 0.04 mass % or more and 0.1 mass % or less.

Cerium is effective in reducing afterglow while being tend to reduce a light output, so that excessive addition thereof is undesirable. A concentration of cerium is practically 5 ppm or more and 30 ppm or less, preferably 10 ppm or more and 25 ppm or less, and further preferably 12 ppm or more and 22 ppm or less.

Examples of phosphors applied to a fluorescent screen includes a phosphor such as $Gd_2O_2S$:Tb or BaFClEu, but in a case of a Tb activated phosphor, it is difficult to obtain a characteristic of 0.06% or less in afterglow of 20 ms later from X-ray irradiation interruption, and it does not comply with the object of the embodiment. The BaFCl:Eu phosphor can satisfy only the afterglow characteristic, but when compared in terms of an overall characteristic including a luminance, it is inferior to $Gd_2O_2S$:Pr or $Gd_2O_2S$:Pr,Ce, so that this phosphor cannot be used solo.

The phosphor used in the fluorescent screen of the X-ray detector of the embodiment makes it possible to provide a fluorescent screen whose light output is equal to or more than 1.4 times the conventional one and whose afterglow of 20 ms later from interruption of irradiation of the X-ray is 0.06% or less, for example. The phosphor used in the X-ray detector of the embodiment can use an irradiation X-ray whose X-ray tube voltage exceeds a conventional range of 80 kV or more and 120 kV or less, and is particularly suitable for a transmitted X-ray inspection apparatus, for example.

The X-ray detector of the embodiment has characteristics that a relative light output is at least 110% (in relation to a standard phosphor) or more and afterglow of 20 ms later from interruption of X-ray irradiation is 0.06% or less. By constituting an X-ray inspection apparatus by using such an X-ray detector, a sufficient detection sensitivity can be obtained by an X-ray with a comparatively low intensity, and a clear inspection image without a residual image can be displayed. Thus, reduced afterglow is kept, so that highly accurate inspection is possible even when high-speed and continuous inspection is carried out. The X-ray inspection apparatus is not limited to an airport luggage inspection apparatus but is also applicable to various security systems.

EXAMPLES

Figure 5:
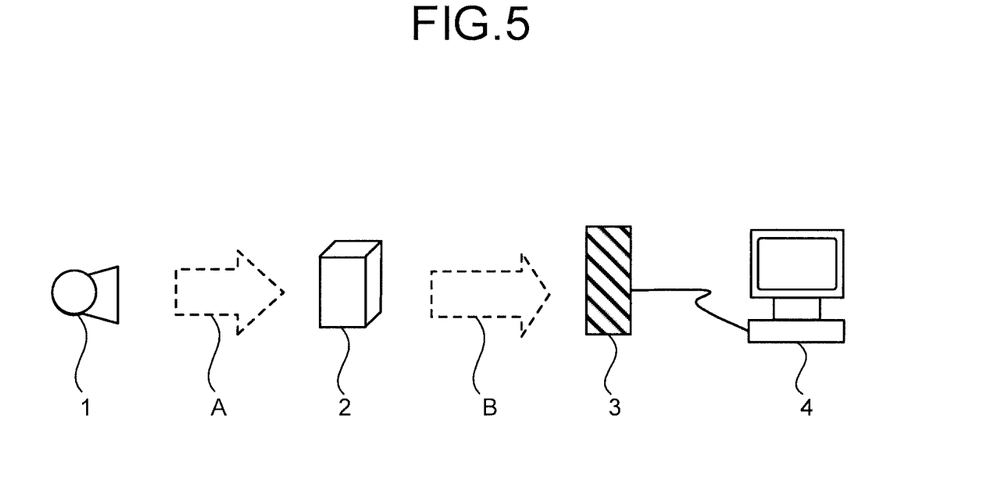
FIG. 5 is a schematic diagram illustrating a configuration example of an X-ray inspection apparatus.

Hereinafter, examples will be described with reference to the drawings. FIG. 5 is a schematic diagram illustrating a configuration example of an X-ray inspection apparatus. In FIG. 5, a configuration example of an airport luggage inspection apparatus is shown as an example of the X-ray inspection apparatus. In FIG. 5, an X-ray irradiator, which is an X-ray tube 1 for example, is illustrated, and an X-ray A emitted from the X-ray tube 1 scans a target 2, which is luggage, for example, moving by means of a conveyor or the like and is irradiated to the target 2. Note that the luggage being the target 2 moves at a speed commensurate to a detection sensitivity of the X-ray A A transmitted X-ray B transmitted through the luggage is detected by an X-ray detector 3. The transmitted X-rays B detected by the X-ray detector 3 are measured as a continuous intensity value, and an image of the inside of the luggage is displayed on a display 4 such as a liquid crystal display in accordance with the intensity of the transmitted X-ray B. Then, the inside of the luggage can be inspected by this image.

Figure 6:
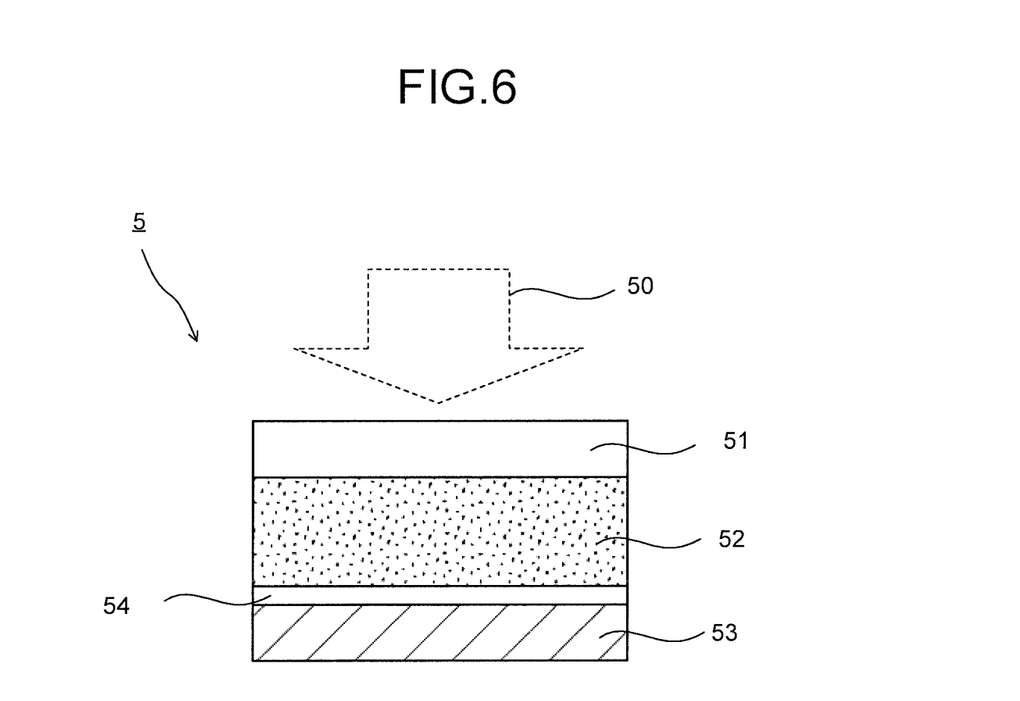
FIG. 6 is a cross-sectional schematic diagram illustrating a configuration example of the X-ray detector.

The X-ray detector 3 has a configuration illustrated in FIG. 6. FIG. 6 is a cross-sectional schematic diagram illustrating a configuration example of the X-ray detector 3. In an inner side of a support 51 having an incident surface of an X-ray 50 in a detector main body 5, a phosphor layer 52 whose light emission direction faces an inner side of the detector main body 5 is provided as a fluorescence generator. The phosphor of the embodiment is used for the phosphor layer 52. A photodiode (PD) 53 is provided as a photoelectric conversion element in an opposite side of the X-ray incident surface of the phosphor layer 52. The photodiode 53 has a light receiving sensitivity in a wavelength range of 400 nm or more and 900 nm or less. A protection layer 54 is provided between the phosphor layer 52 and the photodiode 53. An X-ray 50 is irradiated to the phosphor layer 52 disposed on the inner side of the X-ray incident surface, and the phosphor layer 52 emits visible light toward the photodiode 53. Then, the visible light is detected by the photodiode 53, so that an intensity of the X-ray can be found.

A fluorescent screen in Example 1 is a fluorescent screen produced by using a $Gd_2O_2S$:Pr,Ce phosphor. The $Gd_2O_2S$:Pr,Ce phosphor is manufactured by the following process. First, a praseodymium oxide and a cerium oxide are dissolved in nitride acid at a target ratio (99.3:0.7) of Pr to Ce in weight part to produce a mixed solution thereof. Next, this solution is reacted to a predetermined amount of dimethyl oxalate solution for example, to thereby obtain coprecipitate oxalate of Pr and Ce. This coprecipitate oxalate is baked in the atmosphere at a temperature of 1000° C. or less for several hours to thereby obtain a mixed oxide of Pr and Ce. Thereby, mixed powder in which Pr and Ce are dispersed evenly in minute levels is obtained.

Next, as a process to synthesize a phosphor, raw materials, i.e., a gadolinium oxide, an oxide mixed with activator (Pr, Ce), sulfur, and further, a flux material (an alkali metal carbonate, an alkali metal phosphate, an alkali metal halide or the like) are sufficiently mixed in a powder state at a proportion of an additive amount of Pr in relation to a $Gd_2O_2S$ host material being 0.07 mass % (at the same time, an additive amount of Ce being 0.0005 mass % (5 ppm)), put in a container, and baked at a temperature of 1000° C. or more and 1400° C. or less for several hours. Changing amounts and kinds of sulfur or the flux material enables control of an average particle diameter and particle shapes of phosphors. A phosphor baked product obtained by the above undergoes processes such as washing, dispersion, and sieving, to become a phosphor finished product.

Next, as Comparative Example 1, a phosphor produced by a conventional manufacturing method is synthesized at the same time. A $Gd_2O_2S$ phosphor is manufactured, with additive amounts of Pr and Ce being the same in Example 1. In the manufacturing method of Comparative Example 1, a mixed oxide with an activator is not produced but predetermined amounts of a gadolinium oxide, a praseodymium oxide, a cerium oxide, sulfur, and further, a flux agent, respectively, are mixed as starting raw materials, sufficiently mixed in a powder state to thereby obtain raw material mixed powder. Next, by the same method as in Example 1 after the baking process, a finished product of a phosphor is obtained. Subsequently, a fluorescent screen on an incident side is produced. The fluorescent screen is produced, as illustrated in FIG. 6, by applying a slurry made by mixing the phosphor of the example or the comparative example with a binder and an organic solvent on a support 51 made of a plastic film or a non-woven fabric to form a phosphor layer 52.

Table 2 shows characteristics of X-ray detectors to which the florescent screens containing the phosphors of Examples 1 to 10 and Comparative Examples 1 to 5 are applied, in comparison with a case where the fluorescent screen made by the phosphor of Comparative Example 1 is used. The X-ray detectors applied to the fluorescent screens containing the phosphors of Examples 2 to 10 are different in manufacturing condition regarding any one of an average particle diameter of the phosphor, a Ce concentration, and a weight per unit area of the phosphor, but others, that is, manufacturing methods of the fluorescent screens, configurations of the X-ray detectors and so on are the same as that of Example 1. The X-ray detectors applied to the fluorescent screens containing the phosphors of Comparative Examples of 2 to 5 are different in manufacturing condition regarding any one of an average particle diameter of the phosphor, a Ce concentration, and a weight per unit area of the phosphor, but others, that is, manufacturing methods of the fluorescent screens, configurations of the X-ray detectors and so on are the same as that of Comparative Example 1. Note that a relative light output is only necessary to exceed 110% and that afterglow of 20 ms later from X-ray irradiation interruption is only necessary to be 0.06% or less.

Table 2 shows the relative outputs of the X-ray detectors having the fluorescent screens containing the phosphors of Examples 1 to 10 and Comparative Examples 1 to 5 and afterglow of 20 ms later from X-ray irradiation interruption, respectively. It is known from Table 2 that the relative light output is higher as the average particle diameter of the phosphor is larger. Further, it is known that when the Ce concentration is increased the relative light output becomes low and the afterglow becomes low. Further, controlling the weight per unit area of the phosphor enables control of the relative light output and the afterglow. The higher relative light output is more desirable, and at least 110% or more is necessary when the light output of the comparative standard phosphor (Comparative Example 1) is set to 100%. With the value lower than the above, the light output for analyzing an image accurately cannot be obtained unless an X-ray intensity is increased to exceed the limit or the X-ray intensity is changed. Meanwhile, the smaller afterglow enables displaying of an image with less residual image, but the increased Ce concentration hampers acquisition of the necessary light output, so that being at least 0.06% or less is sufficient.

TABLE 2

| | Phosphor | Average particle diameter [μm] | Weight per unit area of phosphor [mg/cm$^2$] | Ce concentration [ppm] | Relative light output [%] | Afterglow [%] |
|---|---|---|---|---|---|---|
| Example 1 | Gd$_2$O$_2$S:Pr, Ce | 10 | 271 | 5 | 138 | 0.05 |
| Example 2 | Gd$_2$O$_2$S:Pr, Ce | 10 | 292 | 5 | 140 | 0.05 |
| Example 3 | Gd$_2$O$_2$S:Pr, Ce | 20 | 360 | 5 | 150 | 0.06 |
| Example 4 | Gd$_2$O$_2$S:Pr, Ce | 20 | 380 | 5 | 155 | 0.06 |
| Example 5 | Gd$_2$O$_2$S:Pr, Ce | 10 | 280 | 30 | 115 | 0.02 |
| Example 6 | Gd$_2$O$_2$S:Pr, Ce | 20 | 380 | 30 | 120 | 0.03 |
| Example 7 | Gd$_2$O$_2$S:Pr, Ce | 13 | 349 | 10 | 145 | 0.05 |
| Example 8 | Gd$_2$O$_2$S:Pr, Ce | 15 | 300 | 15 | 150 | 0.05 |
| Example 9 | Gd$_2$O$_2$S:Pr, Ce | 15 | 350 | 20 | 131 | 0.04 |
| Example 10 | Gd$_2$O$_2$S:Pr, Ce | 18 | 350 | 15 | 139 | 0.05 |
| Comparative example 1 | Gd$_2$O$_2$S:Pr, Ce | 10 | 90 | 20 | 100 | 0.07 |
| Comparative example 2 | Gd$_2$O$_2$S:Pr, Ce | 8 | 136 | 10 | 90 | 0.06 |
| Comparative example 3 | Gd$_2$O$_2$S:Pr, Ce | 25 | 420 | 10 | 120 | 0.08 |
| Comparative example 4 | Gd$_2$O$_2$S:Pr | 10 | 170 | 0 | 120 | 0.09 |
| Comparative example 5 | Gd$_2$O$_2$S:Pr, Ce | 20 | 440 | 40 | 98 | 0.03 |

As described above, by application of the fluorescent screen containing the phosphor of the example to an X-ray detector, an X-ray inspection apparatus used in luggage inspection which is performed at a higher speed can display a clear image.

While certain embodiments of the present invention have been described herein, these embodiments have been presented by way of example only, and are not intended to limit the scope of the inventions. These novel embodiments may be embodied in a variety of other forms; furthermore, various omissions, substitutions and changes may be made without departing from the spirit of the inventions. The embodiments and their modifications fall within the scope and spirit of the inventions and fall within the scope of the inventions as set forth in claims and their equivalents.

What is claimed is:

1. A fluorescent screen configured to convert an X-ray into visible light, comprising
a gadolinium oxysulfide phosphor activated with praseodymium and cerium,
wherein the phosphor contains praseodymium having a concentration of 0.01 mass % or more and 0.3 mass % or less and cerium having a concentration of 5 ppm or more and 30 ppm or less,
wherein an average particle diameter of the phosphor is 10 μm or more and 20 μm or less, and
wherein a weight per unit area of the phosphor is 300 mg/cm$^2$ or more and 380 mg/cm$^2$ or less.

2. The screen according to claim 1, wherein the concentration of the praseodymium is 0.03 mass % or more and 0.2 mass % or less.

3. The screen according to claim 1, wherein the concentration of the cerium is 10 ppm or more and 25 ppm or less.

4. The screen according to claim 1, wherein the weight is 300 mg/cm$^2$ or more and 350 mg/cm$^2$ or less.

5. The screen according to claim 1, wherein the average particle diameter is 13 μm or more and 18 μm or less.

6. The screen according to claim 1, wherein a Wadell's sphericity of the phosphor is 0.8 or more and 0.96 or less.

7. An X-ray detector configured to detect a transmitted X-ray from a target, comprising the screen according to claim 1.

8. The detector according to claim 7, further comprising
a photodiode configured to convert the visible light into an electrical signal.

9. An X-ray inspection apparatus, comprising:
an X-ray irradiator configured to irradiate an X-ray to a target;
an X-ray detector configured to detect a transmitted X-ray through the target; and
a display configured to display an image of the inside of the target in accordance with an intensity of the transmitted X-ray detected by the X-ray detector,
wherein the detector includes the detector according to claim 7.

* * * * *